United States Patent [19]
Zhou et al.

[11] Patent Number: 5,612,812
[45] Date of Patent: Mar. 18, 1997

[54] METHOD AND APPARATUS FOR PHOTOREFRACTIVE PIROUETTE DISPLAY AND PROCESSING OF ANALOG SIGNALS

[75] Inventors: Gan Zhou, Pasadena, Calif.; Dana Z. Anderson, Boulder, Colo.

[73] Assignee: The United States of America as represented by the Secretary of the Air Force, Washington, D.C.

[21] Appl. No.: 521,680

[22] Filed: Aug. 31, 1995

[51] Int. Cl.⁶ .................................. G02F 1/03; G03H 1/10
[52] U.S. Cl. .............................. 359/244; 359/10; 359/15
[58] Field of Search .......................... 359/1, 9, 10, 11, 359/15, 17, 28, 30, 32, 33, 244; 356/347

[56] References Cited

U.S. PATENT DOCUMENTS

| | | | |
|---|---|---|---|
| 4,359,259 | 11/1982 | Horner et al. | 350/3.7 |
| 4,387,955 | 6/1983 | Ludman et al. | 350/96.19 |
| 4,877,297 | 10/1989 | Yeh | 350/3.68 |
| 4,968,107 | 11/1990 | Yeh | 350/3.64 |
| 5,005,927 | 4/1991 | Cudney et al. | 350/3.64 |
| 5,064,258 | 11/1991 | Inokuchi et al. | 350/3.71 |
| 5,438,439 | 8/1995 | Mok et al. | 359/10 |

*Primary Examiner*—Mark Hellner
*Attorney, Agent, or Firm*—William G. Auton

[57] ABSTRACT

A photorefractive pirouette display device can produce the sonogram of speech sounds by incorporating the short-time Fourier spectrum of speech waves as the input. The device requires a coherent source of optical radiation which can be obtained for a variety of different lasers. A photorefractive circuit is used to display a time-dependent signal, beam. An analog signal is imposed on the beam as temporal modulations on its intensity and/or phase, the pump beam is a plane wave constant amplitude. The signal beam interferes with the pump beam in the photorefractive crystal, the resultant intensity modulation pattern nonuniformly excites the charge carriers in the crystal. The excited charge carrier migrate in the crystal to form a microscope electric field, which produces an index grating in the crystal due to the Pockels effect. The crystal is rotating continually with angular velocity. The pump beam diffracts off of the holographic grating and reconstructs the signal beam. As the crystal rotates, the reconstructed signal beam rotates along a circular ring. In polar coordinates the angle $\Theta$ specifies a position on the ring. The diffracted light at angle $\Theta$ at a given time is denoted by $A(t,1,\Theta)$ where 1 is the crystal thickness. $A(t,1,\Theta)$ is proportional to the signal amplitude at an earlier time. The key to achieving the pirouette display is to ensure that any grating written at any time is always Bragg matched to the pump beam, even if the crystal is in continuous rotation. This requires that the pump beam be parallel (or antiparallel) to the rotational axis of the crystal.

27 Claims, 5 Drawing Sheets

METHOD AND APPARATUS FOR PHOTOREFRACTIVE PIROUETTE DISPLAY AND PROCESSING OF ANALOG SIGNALS

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to diffractive optical elements and more specifically the invention pertains to a time delay device and process that uses a holographic grating and optical beam coupling in a rotating photorefractive crystal for the purpose of displaying and processing of time-dependent analog signals.

The existing standard device for displaying time-dependent signals is the sound spectrograph, or sonograph. It is an electro-mechanical device widely used for speech analysis. It displays the signal intensity vs. time as greylevel plots on a recording paper, the maximum time delay is typically set to be a few seconds. A point by point comparison between the sonograph and the photorefractive pirouette display is irrelevant because they operate on totally different principles.

There are a few differences as far as performance is concerned. Apart from not being as fast as the photorefractive pirouette display, one of the disadvantages of the sonograph is the dynamic range of display. The intensity range of speech is 50–60 dB, whereas that of the sonograph is typically about 12 dB. There exist several methods to enhance the dynamic range of the sonograph. For example the "sectioner" device plots the signal intensity at a specific point of time in its full dynamic range. A contour plot method is also used. These are indirect compensation methods which have limited applicability. The sonograph also handles fewer signal channels compared to the photorefractive pirouette display. An optical device related to the storage and recall of a sequence of images is the optical disk memory. However, the disk memory is not a display because only one piece of information is retrieved at a time.

The task of providing a photorefractive display system for processing analog signals is alleviated to some extent, by the systems disclosed in the following U.S. Patents, the disclosures of which are incorporated herein by reference:

U.S. Pat. No. 4,387,955 issued to Ludman et al; and
U.S. Pat. No. 4,359,259 issued to Horner et al.

None of the cited patents disclose a time delay device that uses a holographic grating and optical beam coupling in a rotating photorefractive crystal for the purpose of displaying and processing of time-dependent analog signals. The patent to Ludman et al discloses a multiplexer/demultiplexer made up of a single component in the form of a holographically formed reflective grating. The Horner et al patent is of similar interest.

SUMMARY OF THE INVENTION

The present invention includes a time delay device that uses a holographic grating and optical beam coupling in a rotating photorefractive crystal for the purposes of displaying and processing of time-dependent analog signals. The device can be used to produce the sonogram of speech sounds by incorporating the short-time Fourier spectrum of speech waves as the input. The device requires a coherent source of optical radiation which can be obtained for a variety of different lasers. A photorefractive circuit is used to display a time-dependent signal beam. An analog signal is imposed on the beam as temporal modulations on its intensity and/or phase, the pump beam is a plane wave of constant amplitude.

The signal beam interferes with the pump beam in the photorefractive crystal, the resultant intensity modulation pattern nonuniformly excites the charge carriers in the crystal. The excited charge carrier migrate in the crystal to form a microscope electric field, which produces an index grating in the crystal due to the Pockels effect. The crystal is rotating continually with angular velocity $\mu\Omega$. The pump beam diffracts off of the holographic grating and reconstructs the signal beam. As the crystal rotates, the reconstructed signal beam rotates along a circular ring. In polar coordinates the angle $\Theta$ specifies a position on the ring. The diffracted light at angle $\Theta$ at a given time is denoted by $A(t,1,\Theta)$ where 1 is the crystal thickness. $A(t,1,\Theta)$ is proportional to the signal amplitude at an earlier time. The key to achieving the pirouette display is to ensure that any grating written at any time is always Bragg matched to the pump beam, even if the crystal is in continuous rotation. This requires that the pump beam be parallel (or antiparallel) to the rotational axis of the crystal.

It is an object of the present invention to provide a photorefractive pirouette display system.

It is another object of the present invention to provide a photorefractive process for displaying time-dependent analog signals.

These objects together with other objects, features and advantages of the invention will become more readily apparent from the following detailed description when taken in conjunction with the accompanying drawings wherein like elements are given like reference numerals throughout.

DESCRIPTION OF THE DRAWINGS

FIGS. 5a to 5b are various designs in the same family of photorefractive display.

DETAILED DESCRIPTION OF THE PREFERRED EMBODIMENT

The present invention includes a time delay device that uses a holographic grating and optical beam coupling in a rotating photorefractive crystal for the purposes of displaying and processing of time-dependent analog signals. Optical beam coupling between a coherent pump beam and a signal beam is accomplished in a rotating photorefractive crystal of $AgGaS_2$, $AgGaSe_2$, $\beta\text{-}BaB_2O_4$, $BaTiO_3$, $Bi_{12}SiO_{20}$, BGO, BTO, GaAs, GaP, InP, KTN, $KNbO_3$, $KTaO_3$, $LiNbO_3$, $LiTaO_3$, or $SrBaNb_2O_6$.

Figure 1:
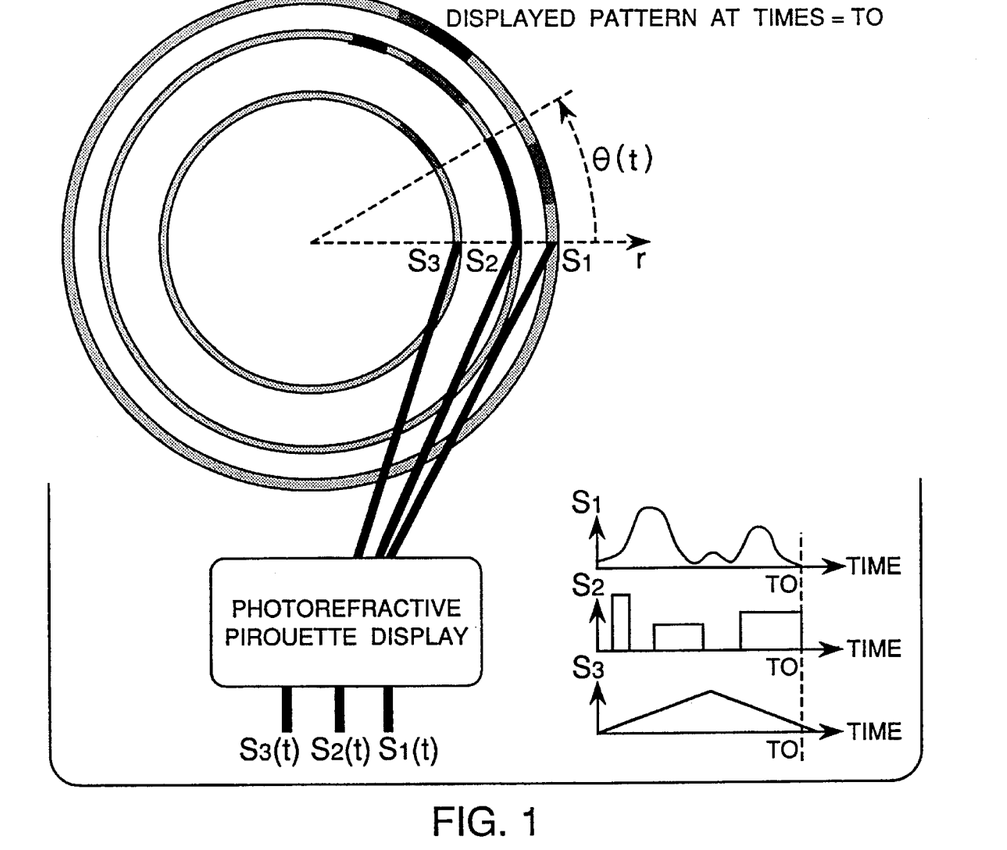
FIG. 1 is a schematic drawing of the photorefractive pirouette display for several time-dependent signal. The time dependence of the input signals $S_1(t)$, $S_2(t)$, and $S_3(t)$ are shown. In the display, the angle $\Theta$ is the "time" coordinate and the radius r is the "channel" coordinate.

This invention pertains to the display and/or processing of time-dependent analog signals. Signals are displayed dynamically in polar coordinate form such that some reference angle $\Theta=0$ indicates "now" and increasing angles displays increasingly earlier times up to some maximum time delays. The radial dimension can be used to designate a discrete or continuum array of parallel signal channels. An example of using this device to display several signals is shown schematically in FIG. 1. Our device is essentially a parallel delay line with maximum time delay from a fraction of a second to minutes, depending on the particular kind of photorefractive crystal used.

Such a time delay device can be used to process acoustic information. For example, it can be used to produce the sonogram of speech sounds by incorporating the short-time Fourier spectrum of speech waves as the input. In this case the polar angle $\Theta$ is the "time" coordinate and the polar radius r is the "frequency" coordinate of the sonogram. The optical intensity of the displayed pattern indicates the power of the corresponding acoustic frequency channels.

The FM sonar system in some varieties of bats also uses a time delay network for signal processing. An FM bat sends out a chirp pulse with an instantaneous frequency which changes with time. An object in the field will generate an echo to the chirp pulse. The remarkable feature of the FM bat is that it uses organized time delays to concentrate the information combined in the entire duration of the echo. The FM bat is able to accurately locate an object with such a mechanism. Our invention can similarly be used in a sonar system.

As will be clear from the explanation that follows, our apparatus requires a coherent source of optical radiation, which is readily available from a broad variety of lasers. The temporal information to be displayed is imposed on an optical beam by appropriate means. Under certain conditions, the intensity of the reproduced signal grows as it propagates to reach a maximum before it starts to decay away. This indicates that in our apparatus an avent is enhanced at a later time after its occurrence at the input. This feature is useful for some speech recognition systems.

Figure 2:
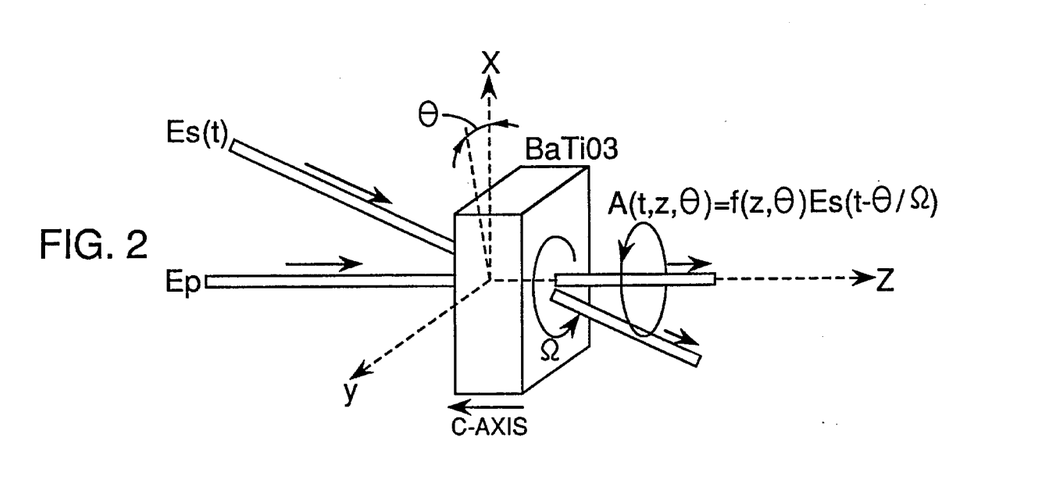
FIG. 2 is a pirouette display circuit which utilizes the processes of hologram formation and optical beam coupling in a rotating photorefractive crystal. The signal beam $E_s(t)$ carries the temporal information to be displayed. The pump beam $E_p$ is a plane wave with constant amplitude. The pump beam and signal beam are fixed in space while the crystal is rotating with angular velocity $\Omega$, the axis of rotations coincides with the pump beam propagation direction. The angular component of the diffracted light is denoted by $A(t,z,\Theta)$.

A photorefractive circuit which displays a time-dependent signal is shown schematically in FIG. 2. An analog signal is imposed on the beam $E_s(t)$ as temporal modulations on its intensity and/or phase, the pump beam $E_p$ is a plane wave with constant amplitude. The signal beam interferes with the pump beam in the photorefractive crystal, the resultant intensity modulation pattern nonuniformly excites the charge carriers in the crystal. The excited charge carriers migrate in the crystal to form a microscopic electric field, which produces a index grating in the crystal due to the Pockels effect. The crystal is rotating continually with angular velocity $\Omega$. The pump beam diffracts off of the holographic grating and reconstructs the signal beam. As the crystal rotates, the reconstructed signal beam rotates along a circular ring. In polar coordinate the angle $\Theta$ specifies a position on the ring. The diffracted light at angle $\Theta$ at a given time t is denoted by $A(t,1,\Theta)$ is proportional to the signal amplitude $E_s$ at an earlier time $t-\Theta/\Omega$.

Figure 3:
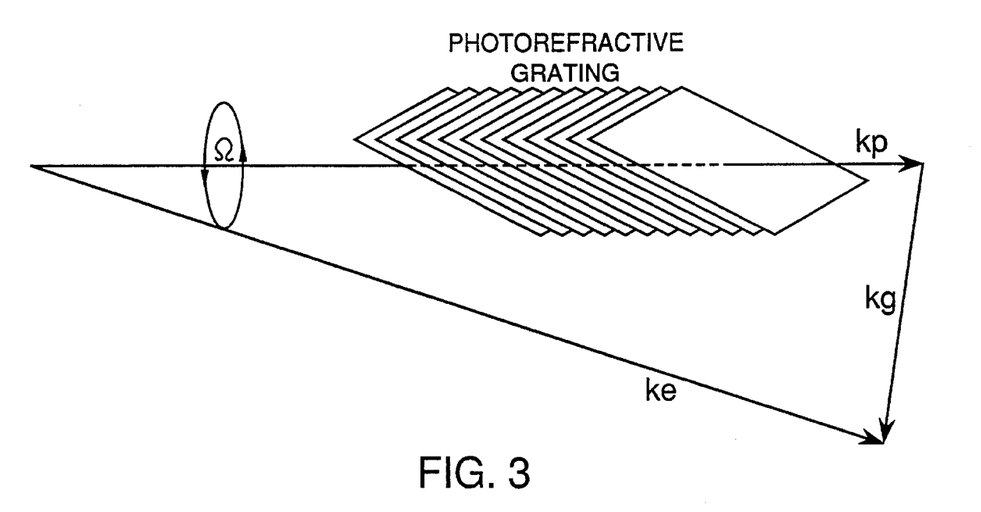
FIG. 3 is the k-vector diagram of the pump beam ($k_p$), the diffracted signal beam ($k_\Theta$), and the holographic grating ($k_g$). As the grating rotates along the $k_p$ axis, the diffracted light obviously rotates around a circular ring. The Bragg-match condition is always satisfied.

The key to achieve the pirouette display is to ensure that any grating written at any time is always Bragg-matched to the pump beam, even if the crystal is in continuous rotation. For the setup in FIG. 2, this requires that the pump beam be parallel (or antiparallel) to the rotational axis of the crystal. The corresponding k-vector diagram of the pump, the signal, and the grating is shown in FIG. 3. If the pump beam is not a plane wave, then other configurations are possible. Examples of photorefractive pirouette display in which the pump is a conical beam will be discussed below.

It is also preferable to orient the photorefractive crystal such that its rotation will not periodically modulate the coupling strength of the crystal. In general this indicates that the crystal should rotate along its c-axis. This constraint can be removed in some cases where the c-axis of the crystal ($Bi_{12}SiO_{20}$, for example) is induced by externally applied electric field. It is possible in principle to keep the applied field fixed in space while the crystal is rotating. An example of such a case will be discussed below.

We have derived the analytic expression for the angular distribution of the diffracted signal waves in the setup of FIG. 2. The theory is based on the photorefractive grating evolving equation and coupled wave equations. Denote the pump and signal waves as $$E_{pump}(\vec{r}) = E_p \exp(i\vec{k}_p \cdot \vec{r})$$

$$E_{signal}(t,x,y,z) = \int A(t,z,\Theta) \exp(i\vec{k}_\Theta \cdot \vec{r}) d\Theta \quad (2)$$

where $\vec{k}_\Theta$ is the propagation vector of the diffracted signal wave along the direction indicated by $\Theta$. $A(t,z,\Theta)$ is the amplitude of the $\vec{k}_\Theta$-component of the diffracted beam. In the undepleted pump approximation, and assuming the coupling constant to be real (which is a very good approximation for crystals such as BaTiO$_3$), the angular distribution of the signal wave at the crystal endface z=1 is given by $$A(t,l,\theta) = E\left(t - \frac{\theta}{\Omega}\right) \cdot \exp\left(-\frac{\theta}{\Omega\tau}\right) \frac{\Gamma l}{\Omega\tau} \frac{I_1\left(2\sqrt{\frac{\Gamma l\theta}{2\Omega\tau}}\right)}{2\sqrt{\frac{\Gamma l\theta}{2\Omega\tau}}} \quad (3)$$

where $I_1$ is the modified Bessel function, and $\tau$ is the crystal time constant. The coupling constant $\Gamma$ is estimated to be approximately 10/cm for BaTiO$_3$ in the configuration of FIG. 2. It is clear that the $k_\Theta$ component of the diffracted wave is proportional to the time-delayed input wave E(t–$\Theta/\Omega$), where is the delay time. The $\Theta$-dependence of A(t,z,$\Theta$) has a peak at $\Theta_m>0$ when $\Gamma l>4$, in which case the diffracted light intensity grows as it rotates before it starts to decay. This is the reason that in our display an event can be enhanced at a later time after its occurence at the input.

An extension to the circuit shown in FIG. 2 uses an extra beam to read out the grating. This is the four-wave mixing version of pirouette display shown in FIG. 4. The signal beam writes a grating with pump beam 1, and pump beam 2 diffracts off of the grating, producing the phase-conjugated signal beam. As the crystal rotates, the phase-conjugated beam displays the signal. The interesting feature of the four-wave mixing configuration is that the original signal beam is automatically suppressed in the display.

Figure 4:
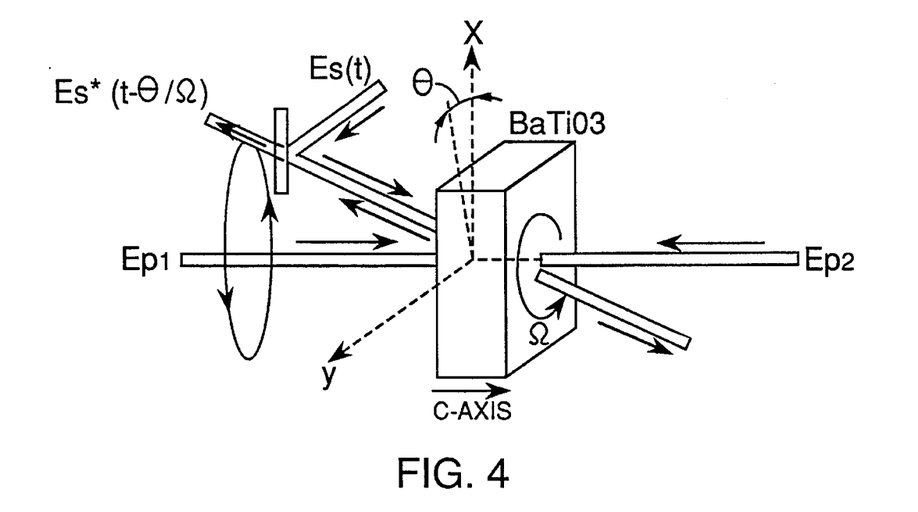
FIG. 4 is the four-wave mixing version of the photorefractive pirouette display. The signal beam writes hologram with pump beam 1 and the hologram is readout by pump beam 2. The resulting phase-conjugated wave displays the signal as the crystal rotates. The original signal beam is suppressed in the display.

The photorefractive circuits shown in FIG. 2 and FIG. 4 can be modified to display an array of signal inputs. Each signal beam in the input array is sent to the crystal at a different angle with respect to the pump beam, and the displayed signals lie on a collection of rings centered around the pump. In this way the polar angle $\Theta$ is the coordinate of time delay, and the radial dimension is the coordinate of input channels.

Figure 5A:
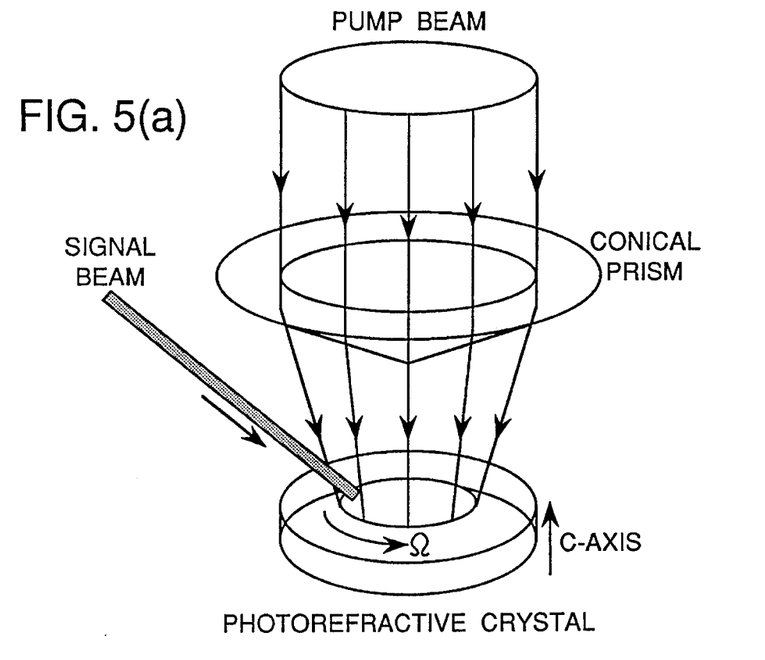
FIG. 5(a) is a photorefractive pirouette display in which the pump beam is conical. The rotating hologram is always Bragg-matched to part of the pump beam due to the circular symmetry of the conical pump. Since this setup allows the pump beam to have an inclination angle with respect to the crystal c-axis, it can be used in some cases when stronger coupling between the pump and signal is desirable.
Figure 5B:
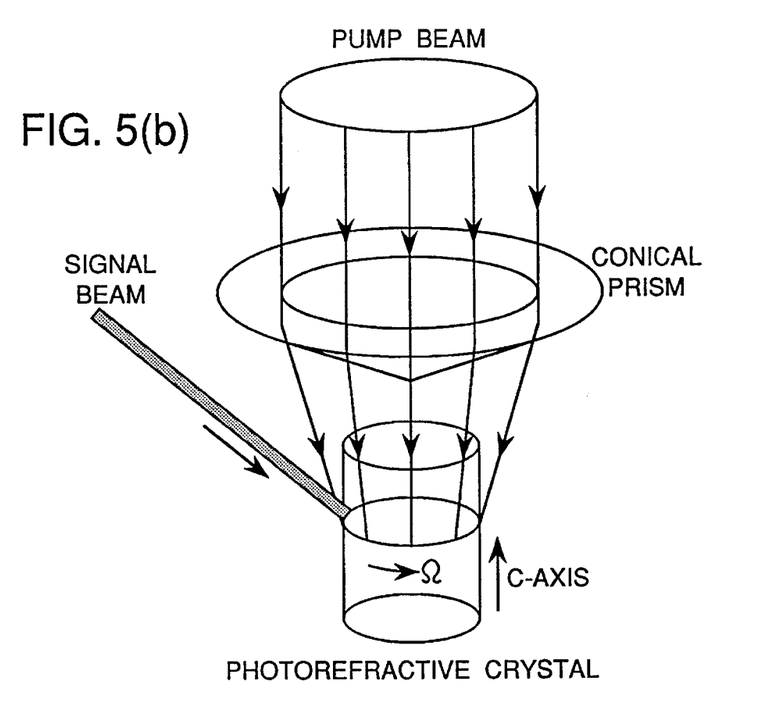
FIG. 5(b) is a photorefractive pirouette display with a rotating cylindric crystal.
Figure 5C:
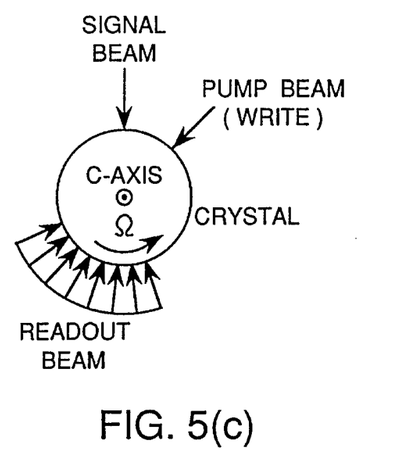
FIG. 5(c) is a waterfall display in which the crystal is a rotating cylinder and the display is in the horizontal plane.
Figure 5D:
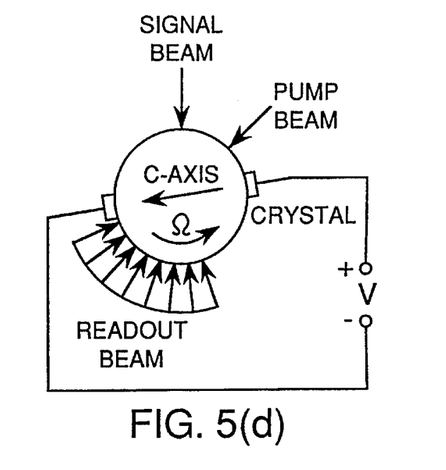
FIG. 5(d) is a hypothetical setup where the induced c-axis does not follow the rotation of the crystals. In this case the pump beam does not have to coincide with the crystal c-axis.

There are many ways to design photorefractive display circuits based on the principles discussed previously in this section. FIG. 5(a) shows a pirouette display in which the pump beam is conical. The rotating hologram is always Bragg-matched to part of the pump beam due to the circular symmetry of the conical pump. Since this setup allows the pump beam to have an inclination angle with respect to the crystal c-axis, it can be used in some cases when stronger coupling between the pump and signal is desirable. The setup in FIG. 5(b) is the same as the one in FIG. 5(a) except that the shape of the crystal is a cylinder rather than a disk. In FIG. 5(c), a waterful dispslay is shown in which the crystal is a rotating cylinder and the display is in the horizontal plane. For certain class of crystals (such as Bi$_{12}$SiO$_{20}$) an external electric field is applied to induce birefringence. If the applied field has a fixed didrection in space, then the induced c-axis will not follow the rotation of the crystal. In this case the pump beam does not have to coincide with the crystal c-axis. A hypothetical setup of this kind is shown in FIG. 5(d) where the electrodes make electric contact with the crystal but do not rotate with it.

Figure 6:
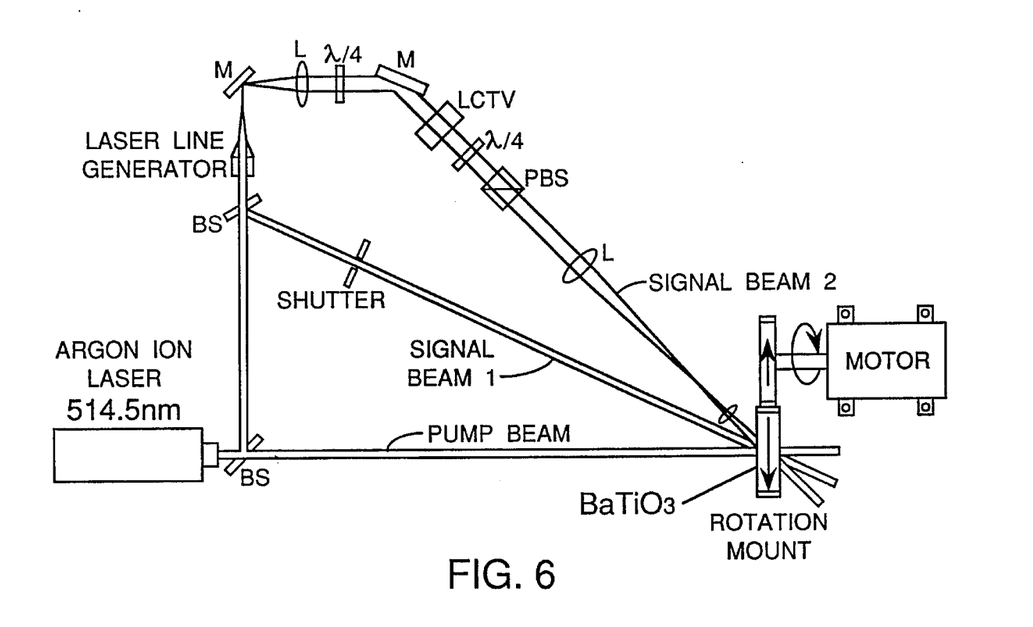
FIG. 6 is the experimental setup to demonstrate photorefractive pirouette display. A shutter provides intensity modulation on signal beam 1, which is used to demonstrate the display of one signal. Signal beam 2 is used to demonstrate simultaneous display of a parallel array of input signal channels. An optical line from a laser line generator passes through a liquid crystal spatial light modulator (LCTV). The modulation simulates the acoustic spectrum of an upchirp followed by a downchirp. A DC motor rotates the crystal sitting in the center of a rotation mount. The pump beam is circularly polarized by passing through a quarter wave plate (λ/4).

One experimental setup for this invention is shown schematically in FIG. 5. This is an implementation of the design shown in FIG. 2. The argon ion laser operates at 514.5 nm. The photorefractive crystal used is BaTiO$_3$, with dimensions 5 mm×4 mm×3 mm, where 3 mm is the thickness along the c-axis. The crystal is placed in the center of a rotation mount driven by a DC motor. The c-axis of the crystal is aligned parallel to the rotation axis of the mount. The laser output is split into the pump beam and the signal beam. The signal beam is intensity modulated either by a mechanical shutter or by a liquid crystal spatial light modulator. The propagation direction of the pump beam coincides with the crystal rotational axis and is antiparallel to the crystal c-axis. In this configuration the pump beam provides gain to the signal beam.

In the first experiment, we demonstrate the display of one signal. Signal beam 1 is intensity modulated by the shutter, signal beam 2 is blocked. The incident angle of single beam 1 is 40 degrees. When the crystal is not rotating, the small signal gain is measured to be 4 and the maximum diffraction efficiency is about 12%. The pump intensity is 2 W/cm$^2$ and the signal beam intensity is 100 mW/cm$^2$ before entering the crystal, at these intensity levels the crystal time constant is about 1 second. The crystal is initially set to rotate at a rate of 2 r.p.m.

Figure 7:
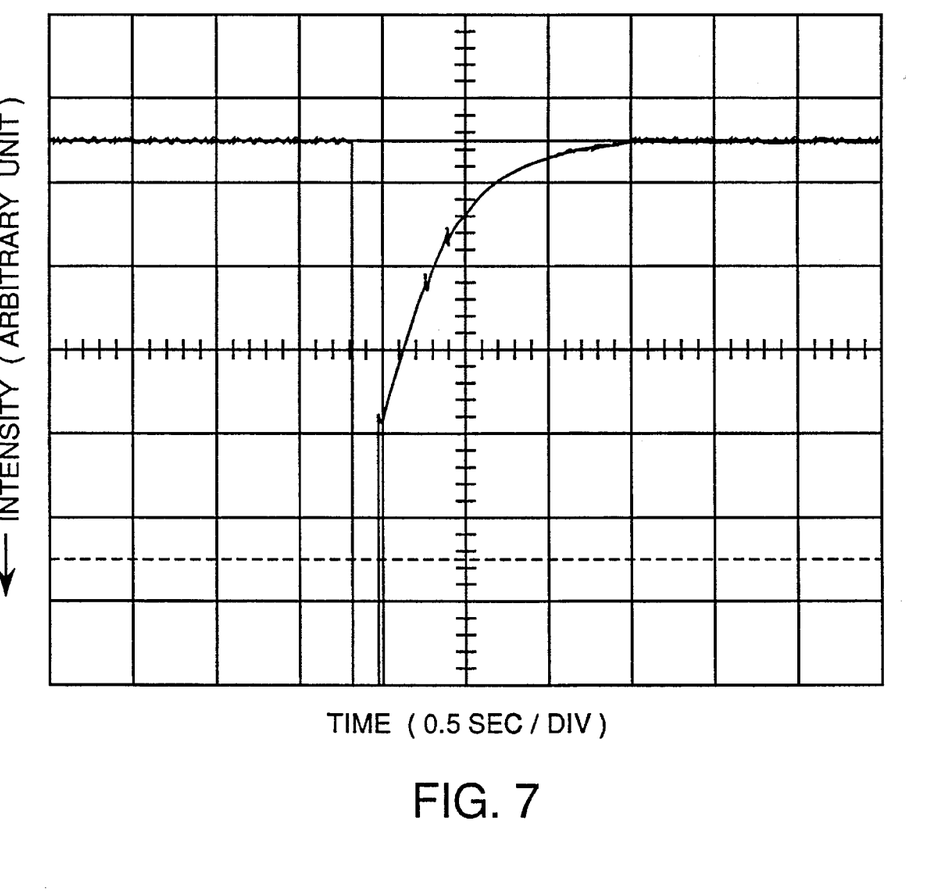
FIG. 7 is a time evolution of the grating written by a 150 ms pulse. A photodiode detects the intensity of the diffracted light. The grating decays away in approximately 1 second in this case.

First the shutter is opened for 150 ms and then closed again. At the output we observed the propagation of the diffracted light along a ring path, it decayed away in about 1 second (see the oscilloscope trace of FIG. 7). When the crystal rotation rate is increased to 7 r.p.m., the decay time of the diffracted light is essentially unchanged, only the diffracted intensity is about 10 times weaker. The maximum time delay achievable depends on the crystal time constant and the gain. For longer time delays, one needs to use a crystal that has higher gain and slower response. We also found out that if the crystal was not perfectly aligned to rotate along the pump beam direction, then the diffracted light decayed away in less than the crystal time constant. This is because such misalignment to certain extent violates the Bragg-match condition between the pump and the rotated grating. So the diffracted intensity decreases with time faster than the grating strength does.

Next we generated a train of pulses at the signal input, each pulse was 50 ms long and neighboring pulses are separated by 50 ms. The displayed pattern forms a collection of roughly 10 line segments of equally length and propagate at the same speed along a ring path.

The second experiment demonstrates simultaneous display of a parallel array of time-dependent signals. Now signal beam 1 is blocked, and signal beam 2 is a laser line which passes through a spatial light modulator made from a liquid crystal TV (LCTV). The LCTV screen is divided uniformly into 10 vertical bars, and they are numbered such that the leftmost bar is number 1 and the rightmost bar is number 10. Each bar can be imaged as one output channel of an acoustic spectrum analyzer. The modulation is deliberately chosen to simulate the acoustic spectrum of an upchirp followed by a downchirp: the bars are turned one one after another according to the sequence 1, 2, . . . , 9, 10, 9, . . . , 2, 1. The "on" time for each bar is 100 ms and the contrast between on and off bars is about 100. The displayed pattern is a sawtooth which propagates at the speed corresponding to the crystal rotation rate. This Sawtooth pattern is the equivalent sonogram of an upchirp followed by a downchirp. The maximum time delay is again roughly 1 second at the beam intensity levels given previously.

Some features of the photorefractive pirouette display device are listed below. Our discussions shall be based on the setup of FIG. 2. The results are similar for other types of photorefractive displays.

The maximum time delay determines the signal span in time corresponding to the displayed pattern at a given instant. The maximum time delay depends on the coupling coefficient and the time constant of the photorefractive crystal used. Our implementation based on BaTiO$_3$ provides a time delay of roughly 1 second. Since the time constant of the crystal is inversely proportional to the total optical intensity in the crystal, one has the degree of freedom to adjust the time delay by changing the incident optical intensity. Crystals of larger size generally provide more coupling strength and hence can be used to implement longer time delays. Other photorefractive materials such as $LiNbO_3$ or $KNbO_3$ can also be used to obtain longer time delays since their time constants are typically in the range of seconds to minutes. The trouble with slow crystals is that their rotation rate has to be very small to allow gratings to buildup.

Temporal resolution is the minimum separation in time ($\Delta t_{min}$) needed for two successive events to be distinguished in the displayed pattern. The temporal resolution is limited by the finite aperture of the crystal, i.e., it is diffraction-limited. Roughly, $$\Delta t_{min} = \frac{2\pi}{k_g d \cdot \Omega} \quad (4)$$

where $k_g$ is the magnitude of the grating k-vector, $\Omega$ is the crystal rotation rate, d is the size of the diffracted beam, which is roughly the crystal aperture. When an array of signal channels are displayed, the magnitude of the grating k-vectors for each signal channel is different. The temporal resolution increases as the incident angle of the signal beam increases. In our implementation the temporal resolution of the display is estimated to be about 0.5 ms with the given crystal at a rotation rate of 8 r.p.m.

Dynamic range is defined as the ratio between the maximum and minimum signal intensity that can be displayed. It is mostly limited by the fanning of the pump beam. The fanning is actually made smaller than usual due to the rotation of the crystal. Since the fanning intensity depends on the place of observation as well as the pump intensity, it is hard in general to give a concrete number. We estimate from our experiment that a dynamic range on the order of 80 dB is possible in most cases.

For fidelity; the display not only reproduces the intensity information but also the phase information of the input signal wave. When the coupling constant of the crystal is small, the displayed intensity generally decay exponentially with increasing time delay. When coupling constant is large ($\delta/>4$), the intensity will first reach a maximum before starting the exponential decay.

The maximum number of signal channels that can be displayed simultaneously by our device is approximately the crystal width divided by the optical wavelength. For a crystal cube of 5 mm on each side, the number of input signals that can be displayed is roughly 10,000. The photorefractive pirouette display operates in real time. It is the fastest display possible.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A photorefractive pirouette display system comprising:
a means for generating a signal beam;
a means for producing a pump beam; and
a means for photorefracting said signal beam and said pump beam into an annular pirouette display containing a time-delay representation of said signal beam.

2. A photorefractive pirouette display system, as defined in claim 1, wherein said photorefraction means comprises a rotating crystal which photorefracts said signal beam and said pump beam into said annular pirouette display.

3. A photorefractive pirouette display system, as defined in claim 1, wherein said producing means comprises a pump laser which directs a coherent ray of light with uniform amplitude into said photorefracting means.

4. A photorefractive pirouette display system, as defined in claim 2, wherein said producing means comprises a pump laser which directs a coherent ray of light with uniform amplitude into said photorefracting means.

5. A photorefractive pirouette display system, as defined in claim 1, wherein said producing means comprises:
a pump laser which directs a coherent ray of light with uniform amplitude; and
a conical prism which directs said coherent ray of light from said pump laser onto said photorefractive means with a predetermined inclination angle to provide thereby said pump beam.

6. A photorefractive pirouette display system, as defined in claim 2, wherein said producing means comprises:
a pump laser which directs a coherent ray of light with uniform amplitude; and
a conical prism which directs said coherent ray of light from said pump laser onto said photorefractive means with a predetermined inclination angle to provide thereby said pump beam.

7. A photorefractive pirouette display system, as defined in claim 1, wherein said photorefracting means comprises a rotating crystal composed of materials selected from a group containing:

$AgGaS_2$, $AgGaSe_2$, $\beta\text{-}BaB_2O_4$, $BaTiO_3$, $Bi_{12}SiO_{20}$, BGO, BTO, GaAs, GaP, InP, KTN, $KNbO_3$, $LiNbO_3$, $LiTaO_3$, and $SrBaNb_2O_6$.

8. A photorefractive pirouette display system, as defined in claim 3, wherein said photorefracting means comprises a rotating crystal composed of materials selected from a group containing:

$AgGaS_2$, $AgGaSe_2$, $\beta\text{-}BaB_2O_4$, $BaTiO_3$, $Bi_{12}SiO_{20}$, BGO, BTO, GaAs, GaP, InP, KTN, $KNbO_3$, $LiNbO_3$, $LiTaO_3$, and $SrBaNb_2O_6$.

9. A photorefractive pirouette display system, as defined in claim 4, wherein said photorefracting means comprises a rotating crystal composed of materials selected from a group containing:

$AgGaS_2$, $AgGaSe_2$, $\beta\text{-}BaB_2O_4$, $BaTiO_3$, $Bi_{12}SiO_{20}$, BGO, BTO, GaAs, GaP, InP, KTN, $KNbO_3$, $LiNbO_3$, $LiTaO_3$, and $SrBaNb_2O_6$.

10. A photorefractive pirouette display system, as defined in claim 5, wherein said photorefracting means comprises a rotating crystal composed of materials selected from a group containing:

$AgGaS_2$, $AgGaSe_2$, $\beta\text{-}BaB_2O_4$, $BaTiO_3$, $Bi_{12}SiO_{20}$, BGO, BTO, GaAs, GaP, InP, KTN, $KNbO_3$, $LiNbO_3$, $LiTaO_3$, and $SrBaNb_2O_6$.

11. A photorefractive pirouette display system, as defined in claim 6, wherein said photorefracting means comprises a rotating crystal composed of materials selected from a group containing:

$AgGaS_2$, $AgGaSe_2$, $\beta\text{-}BaB_2O_4$, $BaTiO_3$, $Bi_{12}SiO_{20}$, BGO, BTO, GaAs, GaP, InP, KTN, $KNbO_3$, $LiNbO_3$, $LiTaO_3$, and $SrBaNb_2O_6$.

12. A photorefractive pirouette display system, as defined in claim 1, which further includes a means for providing a predetermined electric field to said photorefractive means to produce thereby, controlled birefringence in said annular pirouette display.

13. A photorefractive pirouette display system, as defined in claim 2, which further includes a means for providing a predetermined electric field to said photorefractive means to produce thereby, controlled birefringence in said annular pirouette display.

14. A photorefractive pirouette display system, as defined in claim 3, which further includes a means for providing a predetermined electric field to said photorefractive means to produce thereby, controlled birefringence in said annular pirouette display.

15. A photorefractive pirouette display system, as defined in claim 4, which further includes a means for providing a predetermined electric field to said photorefractive means to produce thereby, controlled birefringence in said annular pirouette display.

16. A photorefractive pirouette display system, as defined in claim 5, which further includes a means for providing a predetermined electric field to said photorefractive means to produce thereby, controlled birefringence in said annular pirouette display.

17. A photorefractive pirouette display system, as defined in claim 6, which further includes a means for providing a predetermined electric field to said photorefractive means to produce thereby, controlled birefringence in said annular pirouette display.

18. A photorefractive pirouette display system, as defined in claim 4, which further includes a means for providing a predetermined electric field to said photorefractive means to produce thereby, controlled birefringence in said annular pirouette display.

19. A photorefractive pirouette display system, as defined in claim 5, which further includes a means for providing a predetermined electric field to said photorefractive means to produce thereby, controlled birefringence in said annular pirouette display.

20. A photorefractive pirouette display system, as defined in claim 6, which further includes a means for providing a predetermined electric field to said photorefractive means to produce thereby, controlled birefringence in said annular pirouette display.

21. A photorefractive pirouette display system, as defined in claim 7, which further includes a means for providing a predetermined electric field to said photorefractive means to produce thereby, controlled birefringence in said annular pirouette display.

22. A photorefractive pirouette display system, as defined in claim 8, which further includes a means for providing a predetermined electric field to said photorefractive means to produce thereby, controlled birefringence in said annular pirouette display.

23. A photorefractive pirouette display system, as defined in claim 9, which further includes a means for providing a predetermined electric field to said photorefractive means to produce thereby, controlled birefringence in said annular pirouette display.

24. A photorefractive pirouette display system comprising:

a means for generating a signal beam;

a first pump laser which emits a first coherent ray of light with uniform amplitude as a first pump beam;

a second pump laser which emits a second coherent ray of light with uniform amplitude as a second pump beam; and a rotating crystal which photorefracts said signal beam with said first and second pump beams into an annular pirouette display containing a phase conjugate representation of said signal beam.

25. A photorefractive pirouette display system comprising:

a means for generating a signal beam;

a means for generating the first pump beam which is a coherent ray of light with uniform amplitude;

a means for generating the second pump beam be reflecting said first pump beam from a phase-conjugate mirror; and a rotating crystal which photorefracts said signal beam with said first and second pump beams into an annular pirouette display containing a phase conjugate representation of said signal beam.

26. A photorefractive pirouette display process comprising:

generating a signal beam;

producing a pump beam; and photorefracting said signal beam and second pump beam into an annular pirouette display containing a phase conjugate representation of said signal beam with respect to said pump beam.

27. A photorefractive pirouette display process, as defined in claim 26, wherein said photorefracting step comprises using a rotating crystal which photorefracts said signal beam and said pump beam into said annular pirouette display.

* * * * *